United States Patent
Bandukwala et al.

(10) Patent No.: US 12,353,316 B2
(45) Date of Patent: Jul. 8, 2025

(54) SYSTEMS AND METHODS OF ANOMALY DETECTION

(71) Applicant: Google LLC, Mountain View, CA (US)

(72) Inventors: Farhana Bandukwala, San Clemente, CA (US); Georg Matthias Goerg, Long Island City, NY (US); Samuel Paul Ruth, Bethesda, MD (US); Jonathan Jesse Halcrow, Atlanta, GA (US)

(73) Assignee: GOOGLE LLC, Mountain View, CA (US)

( * ) Notice: Subject to any disclaimer, the term of this patent is extended or adjusted under 35 U.S.C. 154(b) by 234 days.

(21) Appl. No.: 17/912,233

(22) PCT Filed: Sep. 1, 2020

(86) PCT No.: PCT/US2020/048910
§ 371 (c)(1),
(2) Date: Sep. 16, 2022

(87) PCT Pub. No.: WO2022/050934
PCT Pub. Date: Mar. 10, 2022

(65) Prior Publication Data
US 2023/0138371 A1 May 4, 2023

(51) Int. Cl.
*G06F 11/36* (2006.01)
*G06F 11/3604* (2025.01)

(52) U.S. Cl.
CPC ................ *G06F 11/3616* (2013.01)

(58) Field of Classification Search
CPC .................. G06F 11/3616; G06F 11/079
See application file for complete search history.

(56) References Cited

U.S. PATENT DOCUMENTS

2014/0172371 A1\* 6/2014 Zhu .................. G06Q 10/00
702/185
2015/0333998 A1 11/2015 Gopalakrishnan et al.
(Continued)

FOREIGN PATENT DOCUMENTS

CN 110347544 10/2019

OTHER PUBLICATIONS

International Search Report for Application No. PCT/US2020/048910, mailed on May 25, 2021, 3 pages.
(Continued)

*Primary Examiner* — Matthew M Kim
*Assistant Examiner* — Matthew N Putaraksa
(74) *Attorney, Agent, or Firm* — DORITY & MANNING P.A.

(57) ABSTRACT

A method of identifying a contributing cause of an anomaly including receiving a set of timeseries data representing metric values over time, wherein the timeseries data has at least two dimensions, for each of two or more of the timestamps in the set of timeseries data, generating a first and second graph representing (i) the metric values at that timestamp, (ii) the at least two dimensions at that timestamp, and (iii) associations between the metric values at that timestamp, analyzing the first and second graphs associated with each timestamp to identify a particular timestamp including an anomaly, and analyzing the first and second graphs associated with the identified particular timestamp to identify a node that contributed in causing the anomaly.

26 Claims, 6 Drawing Sheets

(56) References Cited

U.S. PATENT DOCUMENTS

| | | | |
|---|---|---|---|
| 2017/0329660 A1 | 11/2017 | Salunke et al. | |
| 2019/0227860 A1 | 7/2019 | Gefen et al. | |
| 2020/0162280 A1 | 5/2020 | Drees et al. | |
| 2020/0387797 A1* | 12/2020 | Ryan | G06N 3/084 |
| 2022/0335347 A1* | 10/2022 | Doan Huu | G06N 20/00 |
| 2024/0054041 A1* | 2/2024 | Nagar | G06F 11/0787 |
| 2024/0235861 A1* | 7/2024 | Lavid Ben Lolo | H04L 9/50 |
| 2024/0303529 A1* | 9/2024 | Rane | G06N 20/00 |

OTHER PUBLICATIONS

International Preliminary Report on Patentability for Application No. PCT/US2020/048910, mailed Mar. 16, 2023, 12 pages.
Machine Translated Chinese Search Report Corresponding to Application No. 202080103695.X on Sep. 9, 2024.

* cited by examiner

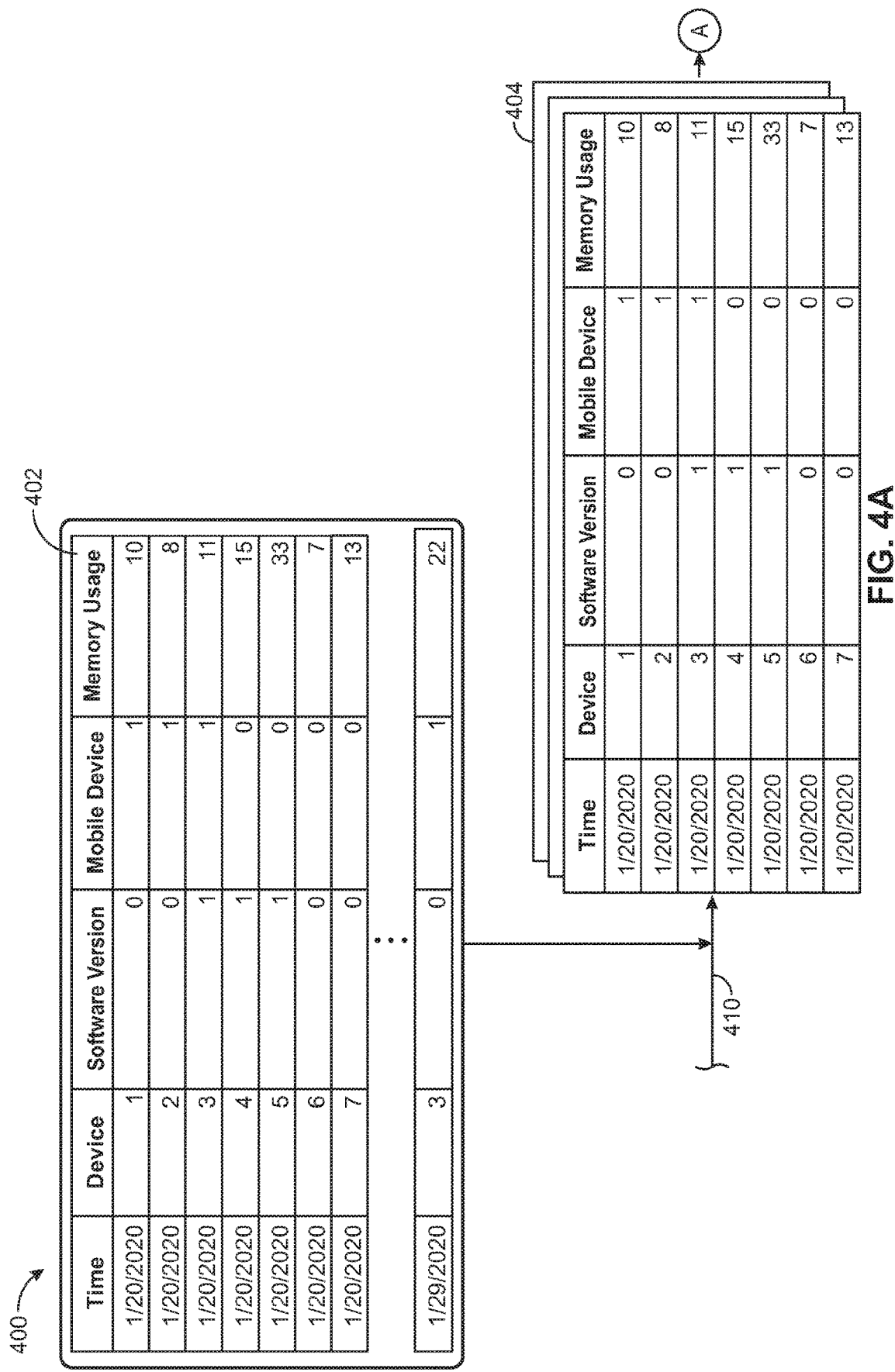

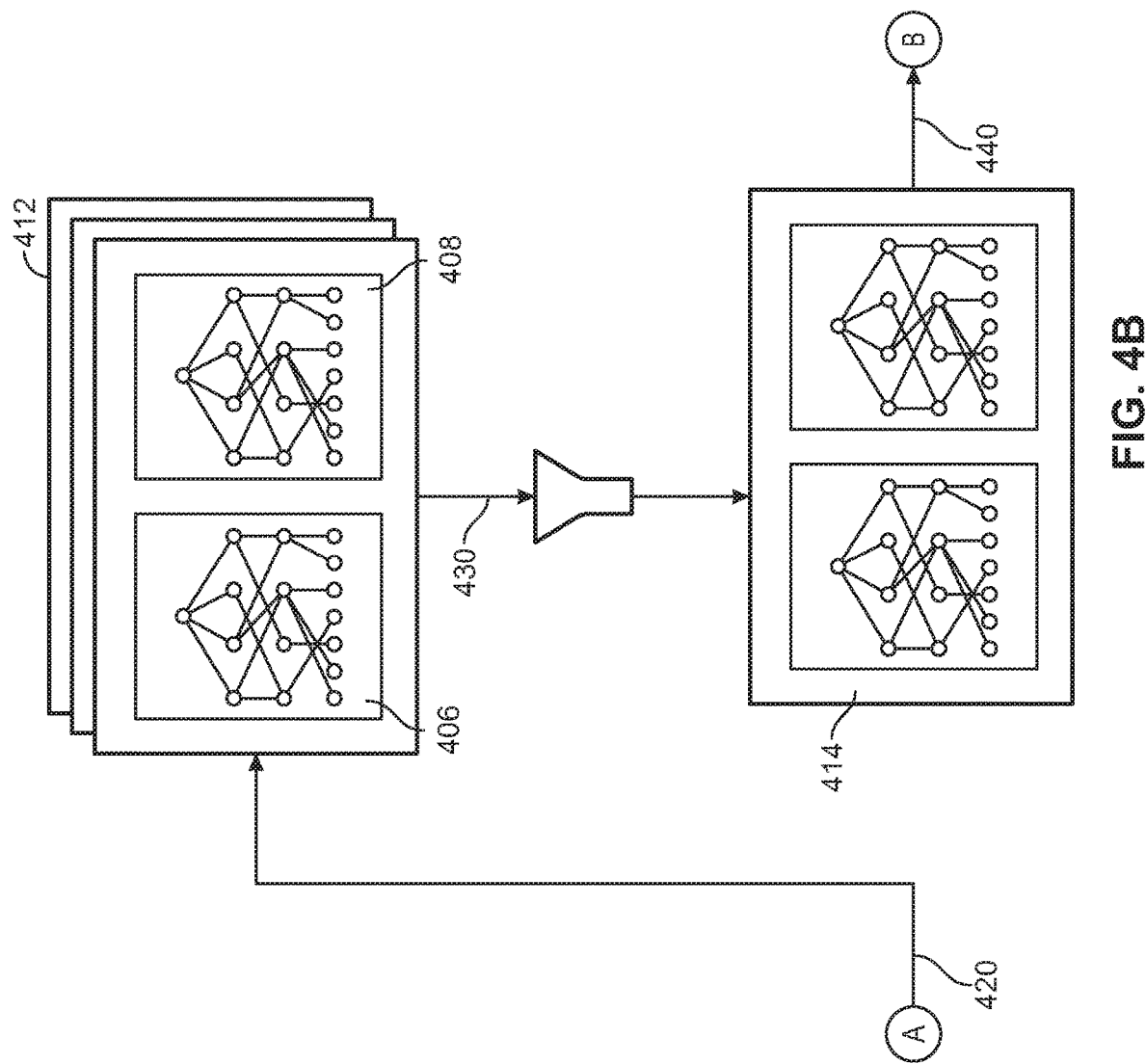

SYSTEMS AND METHODS OF ANOMALY DETECTION

PRIORITY CLAIM

This application is based upon and claims the right of priority under 35 U.S.C. § 371 to International Application No. PCT/US2020/048910, filed on Sep. 1, 2020, which is hereby incorporated by reference herein in its entirety.

BACKGROUND

Occasionally, systems such as computer systems experience anomalies such as spikes in memory utilization or software crashes. It can be helpful to determine the cause of such anomalies, such as a new software update that unexpectedly caused increases in memory utilization. However, it can be difficult to determine the cause of an anomaly in complex systems.

SUMMARY

One implementation of the disclosure relates to a method of identifying a contributing cause of an anomaly including receiving a set of timeseries data representing metric values over time, wherein the timeseries data has at least two dimensions, for each of two or more of the timestamps in the set of timeseries data, generating a first and second graph representing (i) the metric values at that timestamp, (ii) the at least two dimensions at that timestamp, and (iii) associations between the metric values at that timestamp, wherein the metric values of the first graph include the metric values corresponding to that timestamp and wherein the metric values of the second graph are based on anticipated values generated from the received set of timeseries data, analyzing the first and second graphs associated with each timestamp to identify a particular timestamp including an anomaly, and analyzing the first and second graphs associated with the identified particular timestamp to identify a node that contributed in causing the anomaly.

In some implementations, the first graph includes a number of nodes having a metric value associated with the metric value at that timestamp, each corresponding to one or more of the at least two dimensions, and wherein the first graph further includes an edge connecting two of the number of nodes, the edge representing an association between the two nodes, and wherein the second graph includes a number of nodes having an anticipated value associated with the metric value at that timestamp, each corresponding to one or more of the at least two dimensions, and wherein the second graph further includes an edge connecting two of the number of nodes, the edge representing an association between the two nodes. In some implementations, analyzing the first and second graphs associated with each timestamp includes generating a first and second eigenvector associated with the first and second graphs of the particular timestamp and comparing an angle between the first and second eigenvectors.

In some implementations, analyzing the first and second graphs associated with the identified particular timestamp includes performing an operation with a first eigenvector associated with the first graph and a second eigenvector associated with the second graph to generate a result, wherein the result includes an importance of each of the plurality of nodes of the first graph in contributing to the anomaly. In some implementations, the operation is vector subtraction and wherein the result is a vector. In some implementations, analyzing the first and second graphs associated with the identified particular timestamp includes measuring an entropy of the first and second graphs. In some implementations, generating the first and second graphs includes generating a number of first nodes, iteratively generating parent nodes, wherein each parent node is connected by an edge to a child node, and iteratively assigning a weight to the edges connecting each parent node and each child node. In some implementations, the at least two dimensions describe characteristics of entities that generated the values of the metric in the set of timeseries data. In some implementations, the anticipated values are generated based on a Bayesian analysis of the set of timeseries data. In some implementations, the method further including determining, by the one or more processing circuits, a root cause of the anomaly based on the identified node, wherein the root cause is associated with a dimension of the identified node. In some implementations, the method further including determining, by the one or more processing circuits, a solution to the anomaly based on the root cause.

Another implementation of the disclosure relates to a system for identifying a contributing cause of an anomaly including one or more processing circuits comprising one or more processors and one or more memories, the one or more memories having instructions stored thereon that, when executed by the one or more processors, cause the one or more processing circuits to receive a set of timeseries data representing metric values over time, wherein the timeseries data has at least two dimensions, for each of two or more of the timestamps in the set of timeseries data, generate a first and second graph representing (i) the metric values at that timestamp, (ii) the at least two dimensions at that timestamp, and (iii) associations between the metric values at that timestamp, wherein the metric values of the first graph include the metric values corresponding to that timestamp and wherein the metric values of the second graph are based on anticipated values generated from the received set of timeseries data, analyze the first and second graphs associated with each timestamp to identify a particular timestamp including an anomaly, and analyze the first and second graphs associated with the identified particular timestamp to identify a node that contributed in causing the anomaly.

In some implementations, the first graph includes a number of nodes having a metric value associated with the metric value at that timestamp, each corresponding to one or more of the at least two dimensions, and wherein the first graph further includes an edge connecting two of the number of nodes, the edge representing an association between the two nodes, and wherein the second graph includes a number of nodes having an anticipated value associated with the metric value at that timestamp, each corresponding to one or more of the at least two dimensions, and wherein the second graph further includes an edge connecting two of the number of nodes, the edge representing an association between the two nodes. In some implementations, analyzing the first and second graphs associated with each timestamp includes generating a first and second eigenvector associated with the first and second graphs of the particular timestamp and comparing an angle between the first and second eigenvectors.

In some implementations, analyzing the first and second graphs associated with the identified particular timestamp includes performing an operation with a first eigenvector associated with the first graph and a second eigenvector associated with the second graph to generate a result, wherein the result includes an importance of each of the plurality of nodes of the first graph in contributing to the anomaly. In some implementations, the operation is vector subtraction and wherein the result is a vector. In some implementations, analyzing the first and second graphs associated with the identified particular timestamp includes measuring an entropy of the first and second graphs. In some implementations, generating the first and second graphs includes generating a number of first nodes, iteratively generating parent nodes, wherein each parent node is connected by an edge to a child node, and iteratively assigning a weight to the edges connecting each parent node and each child node. In some implementations, the at least two dimensions describe characteristics of entities that generated the values of the metric in the set of timeseries data. In some implementations, the anticipated values are generated based on a Bayesian analysis of the set of timeseries data.

Another implementation of the disclosure relates to one or more non-transitory computer-readable storage media having instructions stored thereon that, when executed by one or more processors, cause the one or more processors to receive a set of timeseries data representing metric values over time, wherein the timeseries data has at least two dimensions and wherein the at least two dimensions describe characteristics of entities that generated the values of the metric in the set of timeseries data, for each of two or more of the timestamps in the set of timeseries data, generate a first and second graph representing (i) the metric values at that timestamp, (ii) the at least two dimensions at that timestamp, and (iii) associations between the metric values at that timestamp, wherein the metric values of the first graph include the metric values corresponding to that timestamp and wherein the metric values of the second graph are based on anticipated values generated from the received set of timeseries data, analyze the first and second graphs associated with each timestamp to identify a particular timestamp including an anomaly, and analyze the first and second graphs associated with the identified particular timestamp by generating a first and second eigenvector associated with the first and second graphs of the particular timestamp and comparing an angle between the first and second eigenvectors to identify a node that contributed in causing the anomaly.

In some implementations, the anticipated values are generated based on a Bayesian analysis of the set of timeseries data. In some implementations, the one or more processors are further configured to determine a root cause of the anomaly based on the identified node, wherein the root cause is associated with a dimension of the identified node. In some implementations, the one or more processors are further configured to determine a solution to the anomaly based on the root cause.

The various aspects and implementations may be combined where appropriate.

BRIEF DESCRIPTION OF THE DRAWINGS

FIGS. 4A-C are a diagram illustrating a method of identifying one or more anomaly sources using the system of FIG. 1, according to an illustrative implementation.

DETAILED DESCRIPTION

Figure 1:
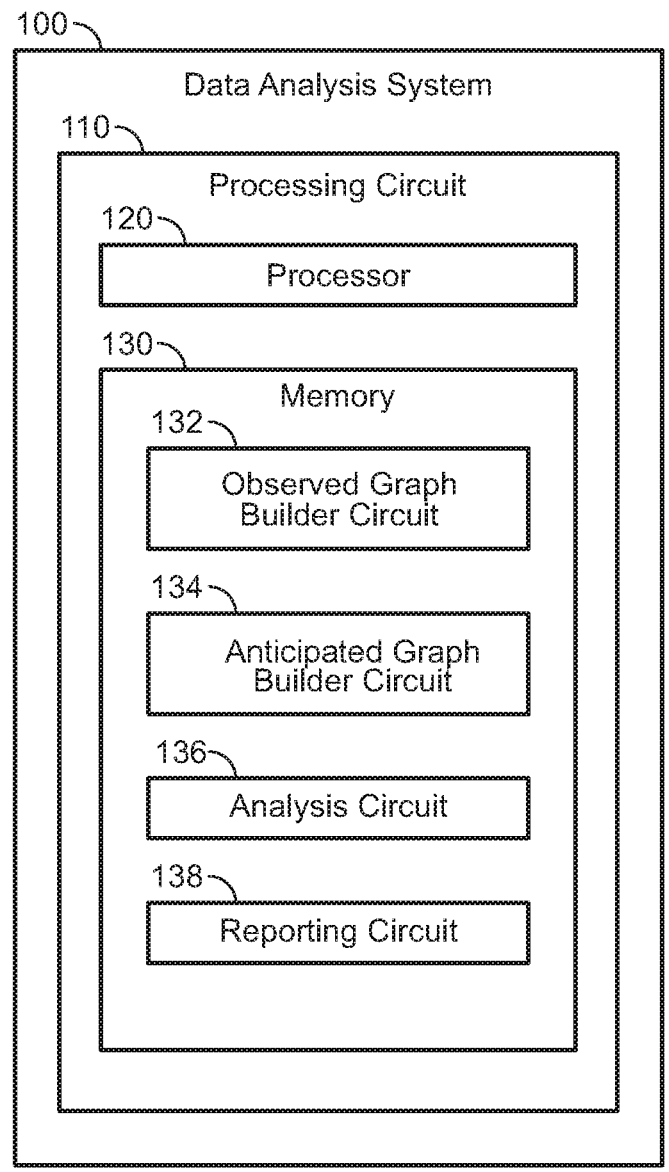
FIG. 1 is a block diagram illustrating a data analysis system for anomaly detection, according to an illustrative implementation.

Following below are more detailed descriptions of various concepts related to, and implementations of, methods, apparatuses, and systems for detecting anomalies and determining principle contributors to the anomalies. The various concepts introduced above and discussed in greater detail below may be implemented in any of numerous ways, as the described concepts are not limited to any particular manner of implementation.

It is often necessary to identify a source of a problem. For example, a new software update may be pushed to a number of devices and it may be necessary to determine why the new software update causes a portion of the devices to crash. This is typically referred to as root cause analysis.

Root cause analysis may be performed by comparing changes in a metric such as memory utilization, processor cycles, or failure rate across time. For example, a number of remote devices in a network may begin to fail and root cause analysis may determine that a new version of software is responsible for the device failures based on identifying an increase in the number of device failures coincident with the deployment of the new software version. The present disclosure relates to systems, methods, and apparatuses for identifying anomalous events and determining the principle contributors to the identified anomalous events.

One solution includes a data analysis system that receives timeseries data, generates graphs representing the hierarchal structure of the timeseries data for each timestamp, and compares the graphs to identify an anomaly in the data and determine one or more nodes that contribute to the anomaly. In various implementations, a graph is a data object consisting of a vertex set and an edge set. The vertex set is a finite nonempty set. The edge set may be empty, but otherwise its elements are two-element subsets of the vertex set. In some implementations, elements of the edge set include edge weights. In various implementations, a set is a collection of distinct objects, none of which is the set itself. In various implementations, an anomaly is a deviation from an anticipated characteristic (e.g., a value, a structure, etc.). For example, an anomaly may include a processor clock-speed spike, a rapid heat increase associated with a component, a spike in the electrical current draw of a component, and/or a sudden decrease in content interaction. In various implementations, the data analysis system generates two graphs for each timestamp of data, a first graph based on the observed value of a metric and a second graph based on an anticipated value of the metric. In various implementations, the graphs include nodes (e.g., a vertex set) corresponding to a dimension of the data and edges (e.g., an edge set) corresponding to connections between dimensions. For example, a graph may include a first node corresponding to a region such as the U.S., a second node corresponding to a software version, and a third node corresponding to both a region and a software version, wherein the third node is linked to the first and second node thereby representing that the software version is deployed in the region (or alternatively that the region deploys the software version). In various implementations, the data analysis system generates the second graph based on a Bayesian analysis of the data. For example, the data analysis system may generate the second graph by analyzing the data to determine anticipated values for the metric associated with a particular dimension at each point in time (e.g., for each timestamp). In various implementations, the data analysis system may identify a set of two graphs (e.g., one based on the observed metric and one based on the expected value of the metric) having an anomaly and may compare the two graphs to identify a node that contributes to the anomaly. In various implementations, the data analysis system may determine a cause of the anomaly based on the identified node (e.g., dimension). As a brief example, the data analysis system may receive a collection of timeseries data corresponding to the metric of computer memory utilization quantities over a two week period. The data may include several dimensions such as computer type, software version, region, and the like. The data analysis system may generate an observed graph (e.g., an object consisting of a vertex set and an edge set, etc.) and an anticipated graph (e.g., an object consisting of a vertex set and an edge set, etc.) for each timestamp of the received data. The data analysis system may compare the pairs of graphs to identify a timestamp including an anomaly, such as a spike in memory utilization, and may compare the observed graph and the anticipated graph corresponding to the identified timestamp to identify a node that contributed to the anomaly, such as a node corresponding to a specific software version in a specific region.

Referring now to FIG. 1, data analysis system 100 for identifying anomalous events and determining the principle contributors to the identified anomalous events is shown, according to an illustrative implementation. In various implementations, data analysis system 100 receives data from external systems and generates sets of graphs based on observed metrics and anticipated metrics. Data analysis system 100 may analyze the sets of graphs to identify a set of graphs associated with an anomaly. Data analysis system 100 may analyze the set of graphs to identity one or more principle contributors (e.g., causes, factors, etc.) associated with the anomaly. In some implementations, data analysis system 100 is a distributed processing system such as a distributed processing cluster, a distributed server, and/or a cloud computing system.

In various implementations, data analysis system 100 receives data (e.g., timeseries data, etc.) from external systems. For example, data analysis system 100 may communicate over a network such as the Internet, local, wide, metro or other area networks, intranets, satellite networks, combinations thereof, or any other type of electronic communications network to receive data from external systems. Data analysis system 100 may be a server, distributed processing cluster, cloud processing system, or any other computing device. Data analysis system 100 may include or execute at least one computer program or at least one script. In some implementations, data analysis system 100 includes combinations of software and hardware, such as one or more processors configured to execute one or more scripts. The external systems may include other computing systems such as analytics systems, server management systems, distributed processing systems, and the like.

Data analysis system 100 may include processing circuit 110 having processor 120 and memory 130. Memory 130 may have instructions stored thereon that, when executed by processor 120, cause processing circuit 110 to perform the various operations described herein. The operations described herein may be implemented using software, hardware, or a combination thereof. Processor 120 may include a microprocessor, ASIC, FPGA, etc., or combinations thereof. In many implementations, processor 120 may be a multi-core processor or an array of processors. Memory 130 may include, but is not limited to, electronic, optical, magnetic, or any other storage devices capable of providing processor 120 with program instructions. Memory 130 may include a floppy disk, CD-ROM, DVD, magnetic disk, memory chip, ROM, RAM, EEPROM, EPROM, flash memory, optical media, or any other suitable memory from which processor 120 can read instructions. The instructions may include code from any suitable computer programming language such as, but not limited to, C, C++, C#, Java, JavaScript, Perl, HTML, XML, Python and Visual Basic. Memory 130 may include observed graph builder circuit 132, anticipated graph builder circuit 134, analysis circuit 136, and reporting circuit 138.

Observed graph builder circuit 132 may receive data and generate a data structure based on the received data. In various implementations, observed graph builder circuit 132 receives data from an external system. In various implementations, the data includes timeseries data. In various implementations, observed graph builder circuit 132 generates a data object consisting of a vertex set and an edge set (e.g., a graph) where each element in the vertex set corresponds to a slice of the data having one or more dimensions. For example, a 3-dimensional slice may be an element of the vertex set having an observed metric value associated with a specific country, a specific software version, and a specific content item. In various implementations, the graph generated by observed graph builder circuit 132 corresponds to observed metric values included in the received data. Generation of the data structure is discussed with reference to FIG. 3 below. A brief example is as follows.

Observed graph builder circuit 132 may receive data from an external system. The data may be multi-series data having one or more dimensions, in addition to the metric, for every point in time. For example, a single multi-series data element may be: "time_value=2010-10-11 00:00:00.000-01:00, country_id=2116, serving_restriction=SERVING_RESTRICTION_NO_RESTRICTION, creative_id=1238484849, interactions=12" where "interactions" is the metric. Observed graph builder circuit 132 may split the multi-series data by timestamp. For example, observed graph builder circuit 132 may split the multi-series data into a number of data structures each containing data corresponding to a particular timestamp (e.g., "2010-10-11 00:00:00.000-01:00" as shown above, etc.). Observed graph builder circuit 132 may generate a node (e.g., a vertex in the vertex set, etc.) for each multi-series data element (assuming no duplicates in the multi-series data) and/or one or more edges connecting node pairs. For example, a node may be a tuple including one or more dimensions and a metric value and an edge may be a tuple including a first node, a second node, and an edge weight. In various implementations, the metric value corresponds to an observed metric value included in the received data. The edge weight may correspond to the second node's effect on the metric value of the first node. For example, a first node may have a metric value of 100 and may be linked with 3 other nodes via edges: a second node having a metric value of 30, a third node having a metric value of 30, and a fourth node having a metric value of 40, wherein the edge weight of the edge linking the first node and the fourth node is 40. In some implementations, the edge weights are normalized. For example, in the previous example the edge weight of the edge linking the first node and the fourth node may be 0.4. In various implementations, the graph structure generated by observed graph builder circuit 132 is hierarchical. For example, a first node having dimensions "country_id" and "software_version" may be hierarchically below a second node having a single dimension "country_id." To continue the previous example, the metric value of the second node may correspond to a sum of the metric values of all other nodes having the dimension "country_id." In various implementations, edges are directional. For example, an edge may connect a parent node to a child node. In various implementations, the graph is a directed acyclic graph (DAG) or other flow graph.

Anticipated graph builder circuit 134 may receive data and generate a data structure based on the received data. In various implementations, anticipated graph builder circuit 134 receives data from an external system. In various implementations, the data includes timeseries data. In various implementations, anticipated graph builder circuit 134 generates a data object consisting of a vertex set and an edge set (e.g., a graph) where each element in the vertex set corresponds to a slice of the data having one or more dimensions. For example, a 3-dimensional slice may be an element of the vertex set having an anticipated metric value associated with a specific country, a specific software version, and a specific content item. In various implementations, the graph generated by anticipated graph builder circuit 134 corresponds to anticipated metric values generated using the received data. In various implementations, anticipated graph builder circuit 134 generates graphs similar to observed graph builder circuit 132 except using anticipated metric values (e.g., metric values generated using statistical analysis, etc.) corresponding to each node (e.g., slice, etc.) instead of the observed metric value itself. A brief example is as follows.

Anticipated graph builder circuit 134 may receive data from an external system. In various implementations, the data is the same data received by observed graph builder circuit 132. Additionally or alternatively, anticipated graph builder circuit 134 may receive additional data. For example, anticipated graph builder circuit 134 may receive historical data associated with a metric in addition to the data received by observed graph builder circuit 132. The data may be multi-series data having one or more dimensions, in addition to the metric, for every point in time. For example, a single multi-series data element may be: "time_value=2010-10-11 00:00:00.000-01:00, country_id=2116, serving_restriction=SERVING_RESTRICTION_NO_RESTRICTION, creative_id=1238484849, interactions=12" where "interactions" is the metric. In some implementations, anticipated graph builder circuit 134 splits the multi-series data by timestamp. In various implementations, anticipated graph builder circuit 134 analyzes the received data to generate anticipated metric values corresponding to each slice. For example, anticipated graph builder circuit 134 may implement a Bayesian time series algorithm that analyzes the received data and/or historical data to generate metric values associated with the most granular nodes (e.g., nodes at the bottom of the hierarchy, nodes having the greatest number of dimensions, etc.). In some implementations, anticipated graph builder circuit 134 generates a probability distribution associated with the value of the metric at each slice. In various implementations, anticipated graph builder circuit 134 uses Bayesian statistics to generate the anticipated metric values. However, many other statistical methods and/or algorithms may be used such as machine learning (e.g., a neural network, etc.) and the like. Anticipated graph builder circuit 134 may generate a node (e.g., a vertex in the vertex set, etc.) for each slice and/or one or more edges connecting node pairs. For example, a node may be a tuple including one or more dimensions and a metric value and an edge may be a tuple including a first node, a second node, and an edge weight. In various implementations, the metric value is an anticipated metric value generated by anticipated graph builder circuit 134. The edge weight may correspond to the second node's effect on the metric value of the first node. In some implementations, the edge weights are normalized. In various implementations, the graph structure generated by anticipated graph builder circuit 134 is hierarchical. In various implementations, anticipated graph builder circuit 134 generates graphs from the bottom up. For example, anticipated graph builder circuit 134 may generate anticipated metric values for the most granular nodes and may propagate the parent nodes and edges based on the anticipated metric values of the child nodes. In various implementations, edges are directional. In various implementations, the graph is a directed acyclic graph (DAG) or other flow graph. In various implementations, anticipated graph builder circuit 134 generates a graph for each timestamp in the multi-series data. In various implementations, each graph generated by anticipated graph builder circuit 134 is paired with a graph generated by observed graph builder circuit 132 corresponding to the same timestamp.

Analysis circuit 136 may analyze the graphs generated by observed graph builder circuit 132 and anticipated graph builder circuit 134 to identify anomalous events and determine the principle contributors to the identified anomalous events. In various implementations, analysis circuit 136 analyzes sets of graphs associated with each timestamp to identify a set of graphs corresponding to a timestamp that include an anomaly. Additionally or alternatively, analysis circuit 136 may analyze the set of graphs to identify one or more nodes. In various implementations, the one or more nodes correspond to principle contributors to the identified anomaly. For example, analysis circuit 136 may receive a graph set associated with memory utilization across several dimensions and may identify an anomaly corresponding to a spike in memory utilization associated with devices in a particular region and may identify a specific node (e.g., slice corresponding to particular dimensions, etc.) contributing to the anomaly. In various implementations, analysis circuit 136 generates a measure of node activity associated with the graphs. For example, analysis circuit 136 may generate one or more eigenvectors based on an adjacency matrix of the graphs. In some implementations, analysis circuit 136 generates one or more PageRank vectors. For example, analysis circuit 136 may generate a PageRank vector for each graph and may compare the PageRank vectors to identify an anomaly and/or a node. As an additional example, analysis circuit 136 may generate a first PageRank vector for a first set of graphs and may generate a second PageRank vector for a second set of graphs and may generate a cosine similarity between the first and second PageRank vectors to identify an anomalous observed graph (e.g., an observed graph that differs in a significant way from an anticipated graph, a graph likely to have an anomalous node, etc.). As yet another example, analysis circuit 136 may generate a first PageRank vector for a first graph (e.g., an observed graph) and second PageRank vector for a second graph (e.g., an anticipated graph) and may compare the first and second PageRank vectors component-wise to identify a specific node. Analysis of graphs is discussed in detail below with reference to FIGS. 4B-4C.

Reporting circuit 138 may generate and transmit reports. In various implementation, reporting circuit 138 transmits reports to external systems. Reports may include one or more identified anomalies and/or one or more identified principle contributors to the identified anomalies. In various implementations, the principle contributors include dimensions associated with a node. For example, reporting circuit 138 may transmit a report indicating an anomaly was detected and that the cause of the anomaly is associated with a specific software version in a specific region. In various implementations, reporting circuit 138 identifies a root cause. For example, reporting circuit 138 may receive information from analysis circuit 136 and identify a root cause based on the received information. In some implementations, reporting circuit 138 generates statistical information. For example, reporting circuit 138 may perform a statistical analysis of information received from analysis circuit 136 and generate aggregate statistics. Additionally or alternatively, reporting circuit 138 may identify specific components and/or entities associated with an anomaly. For example, reporting circuit 138 may identify a specific software version responsible for a spike in memory utilization on user devices.

In various implementations, reporting circuit 138 transmits data periodically. For example, reporting circuit 138 may transmit data at a predefined time. As another example, reporting circuit 138 may transmit data on an interval (e.g., every ten minutes, every ten hours, etc.). In some implementations, reporting circuit 138 transmits data dynamically. For example, reporting circuit 138 may transmit data in response receiving information from analysis circuit 136.

Figure 2:
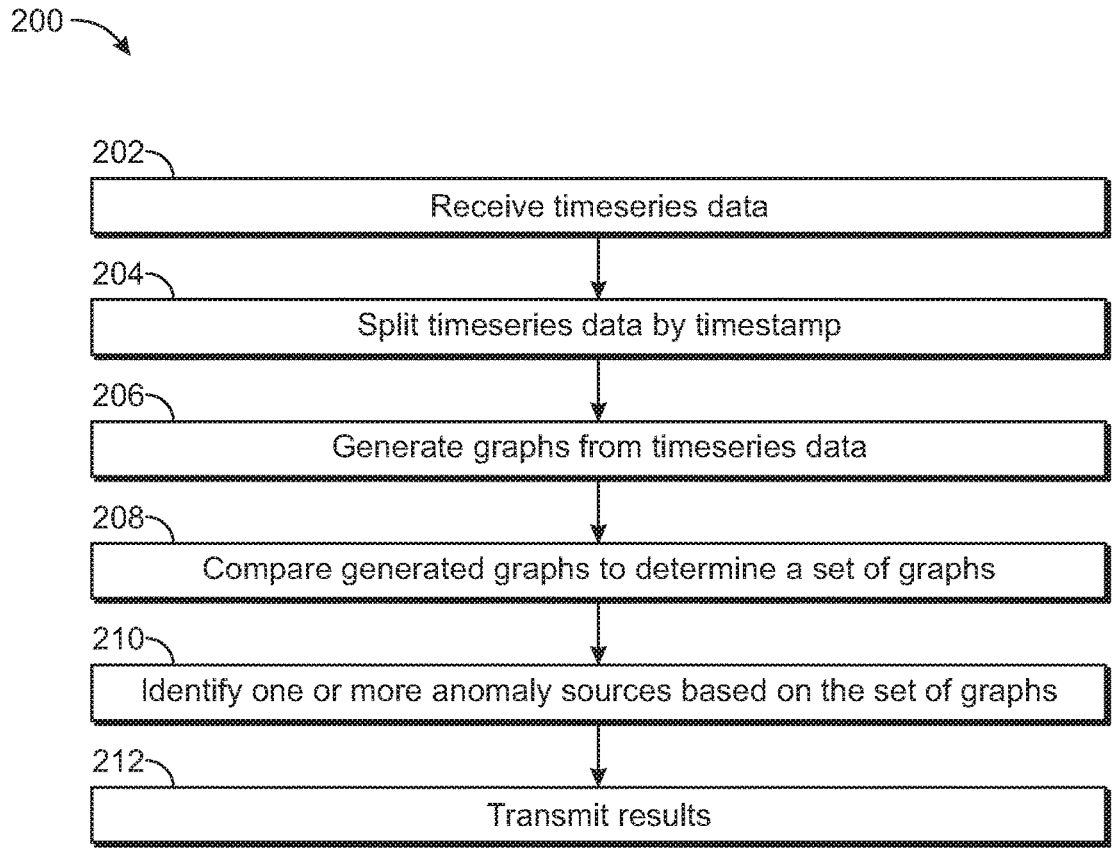
FIG. 2 is a flow diagram illustrating a method of identifying one or more anomaly sources using the system of FIG. 1, according to an implementation.

Referring now to FIG. 2, method 200 for identifying anomalous events and determining the principle contributors to the identified anomalous events is shown, according to an illustrative implementation. In various implementations, data analysis system 100 performs method 200. For example, an external system may send data analysis system 100 data and data analysis system 100 may perform method 200 to identify one or more principle contributors associated with an anomaly and may transmit the principle contributors to the external system.

At step 202, data analysis system 100 may receive timeseries data. The timeseries data may be associated with a metric value over time. For example, the timeseries data may include memory utilization values associated with a distributed processing system over a period of operation. In various implementations, the timeseries data includes one or more dimensions. For example, the timeseries data may include a region, a language, a task group, a software version, an identifier, and/or the like. The timeseries data may be received from various sources. For example, data analysis system 100 may receive timeseries data from an optimization engine, a mobile application management platform, a web server, an alarm system, an analytics system, an ad-serving system, and/or any other system.

At step 204, data analysis system 100 may split the timeseries data by timestamp. In various implementations, step 204 includes generating a separate data object corresponding to each timestamp in the timeseries data. For example, data analysis system 100 may generate a table for each timestamp, wherein each table includes the timeseries values associated with a particular timestamp. At step 206, data analysis system 100 may generate graphs from the timeseries data. In various implementations, data analysis system 100 generates graphs from the data objects separated by timestamp. For example, data analysis system 100 may generate a pair of graphs for each table corresponding to a particular timestamp. In various implementations, data analysis system 100 generates two graphs for each timestamp. For example, data analysis system 100 may generate a first graph based on observed metric values corresponding to a particular timestamp and may generate a second graph based on anticipated metric values generated based on the observed metric values of a particular timestamp. In some implementations, data analysis system 100 generates an anticipated graph for each timestamp based on historical data. Generation of graph is discussed in detail with reference to FIG. 3 below.

At step 208, data analysis system 100 compares generated graphs to determine a set of graphs. For example, data analysis system 100 may analyze the sets of graphs generated in step 206 to identify a pair of graphs having an anomaly. The anomaly may correspond to a difference between an observed metric value and an anticipated metric value. In various implementations, step 208 includes generating a PageRank vector for each graph. For example, data analysis system 100 may generate a PageRank vector for each graph and may compare a cosine similarity between the PageRank vectors of the observed graph and the anticipated graphs to identify a set of graphs having an anomaly. The PageRank vector may identify a level of importance of a particular node within a graph based on the number and quality of the connections of the node. In some implementations, the PageRank vector $\hat{x}$ is the solution of the linear system $(\hat{I}-a\hat{P})\hat{x}=(1-a)\hat{v}$ where $\hat{P}$ is a column stochastic matrix, $0 \leq a < 1$, and $\hat{v}$ is a probability vector. In some implementations, data analysis system 100 may compare a similarity of the graphs. For example, data analysis system 100 may implement the function $$sim(G_t, G_{t+h}) = \frac{<\text{activity}_t, \text{activity}_{t+h}>}{|\text{activity}_t| \cdot |\text{activity}_{t+h}|} = \cos\theta \in [-1, 1]$$

where $G_t$ is a first graph, $G_{t+h}$ is a second graph, activity$_t$ is a measure of activity associated with the first graph, activity$_{t+h}$ is a measure of activity associated with the second graph, and $\theta$ is an angle between the vectors representing the first graph and the second graph. In some implementations, activity corresponds to the PageRank of a graph.

At step 210, data analysis system 100 may identify one or more anomaly sources based on the set of graphs. For example, data analysis system 100 may analyze the set of graphs determined in step 208 to identify one or more nodes that contribute to the identified anomaly. In various implementations, the identified node corresponds to a node that principally contributes (e.g., is a major factor in, significantly contributes to bringing about, etc.) to the identified anomaly. For example, the identified anomaly may be a spike in memory allocation associated with a mobile application (e.g., the metric value) and data analysis system 100 may identify a node corresponding to a specific version of a dependency that the mobile application utilizes (e.g., a library, etc.). In some implementations, data analysis system 100 may identify a root cause associated with the anomaly. For example, data analysis system 100 may determine which dimensions are associated with the node (e.g., based on the slice, etc.) and may determine which dimension caused the anomaly. In various implementations, step 210 includes comparing PageRank vectors. For example, data analysis system 100 may compute the component-wise absolute difference between an observed graph and an anticipated graph to identify a node having the largest value (e.g., the largest difference, etc.).

At step 212, data analysis system 100 may transmit results. In various implementations, data analysis system 100 may transmit results to an external system. For example, data analysis system 100 may transmit results to an external analytics system. In various implementations, the results include one or more root causes of an identified anomaly. Additionally or alternatively, the results may include additional information associated with the anomaly (e.g., what devices were affected, information describing the anomaly, a time that the anomaly occurred, context information associated with the anomaly, etc.). In some implementations, step 212 fixes the cause of the anomaly. For example, if a new software update is causing devices to crash, data analysis system 100 may identify the software version causing the crashes and may push a patch (e.g., a software reversion, etc.) to correct the error. In various implementations, step 212 includes determining a solution to the anomaly and/or resolving the anomaly. For example, step 212 may include deploying additional computing resources to a region that is experiencing unusually slow response times (e.g., due to a computational bottleneck, etc.).

Figure 3:
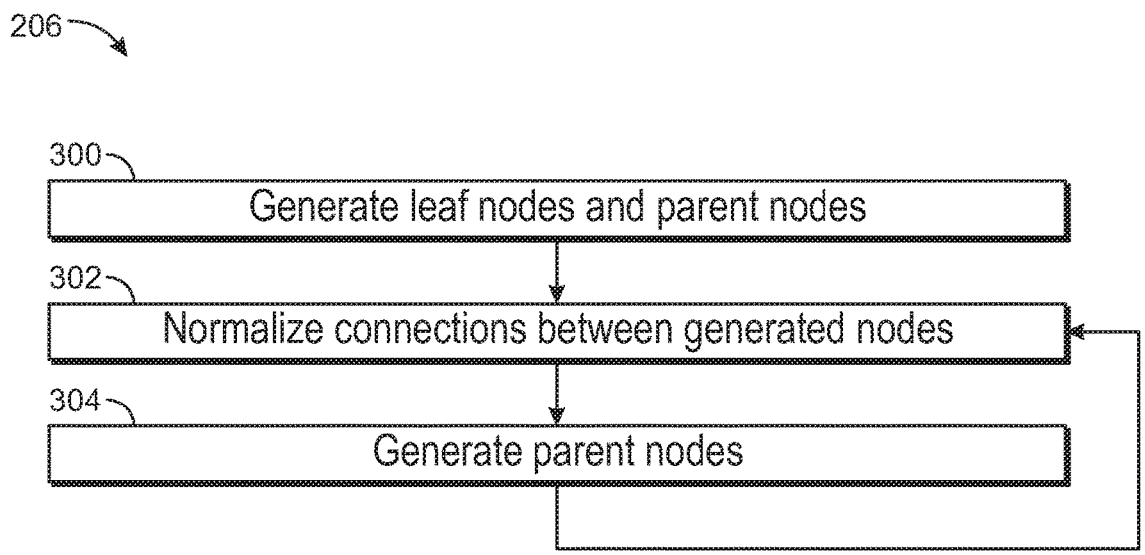
FIG. 3 is a flow diagram illustrating a method of generating a graph for anomaly detection using the system of FIG. 1, according to an illustrative implementation.

Referring now to FIG. 3, step 206 of generating graphs from timeseries data is shown in greater detail, according to an illustrative implementation. In various implementations, data analysis system 100 performs step 206 twice, once to generate an observed graph and once to generate an anticipated graph. Additionally or alternatively, data analysis system 100 may perform step 206 a number of times to generate a number of graphs. In brief summary, step 206 includes generating graphs from the bottom up (e.g., generating the most specific nodes first and building to the most general nodes, etc.). In various implementations, data analysis system 100 generates and normalizes edges between the nodes as it builds subsequent nodes. In various implementations, data analysis system 100 generates graphs based on observed metric values (e.g., the timeseries data received during step 202, etc.). Additionally or alternatively, data analysis system 100 may generate anticipated metric values (e.g., based on the timeseries data received during step 202, from historical data, etc.) and may generate graphs based on the generated anticipated metric values. For example, data analysis system 100 may receive timeseries data corresponding to observed metric values and may perform a Bayesian time series analysis to compute anticipated metric values and may use the anticipated metric values to generate an anticipated graph.

At step 300, data analysis system 100 may generate leaf nodes and parent nodes. In various implementations, generating leaf nodes includes generating one or more elements for the vertex set. For example, data analysis system 100 may generate an element for the vertex set that corresponds to a node having a metric "interactions=12" and dimensions "time_value=2010-10-11 00:00:00.000-01:00, country_id=2116, serving_restriction=SERVING_RESTRICTION_NO_RESTRICTION, creative_id=1238484849." In various implementations, the leaf nodes correspond to the lowest level nodes. For example, the leaf nodes may represent the slices having the greatest number of dimensions. In various implementations, the parent nodes represent parent nodes of the leaf nodes. To continue the previous example, a parent node may be a node having a metric "interactions=22" and dimensions "time_ value=2010-10-11 00:00:00.000-01:00, country_id=2116, serving_restriction=SERVING_RESTRICTION_NO_RESTRICTION." In various implementations, step 300 includes generating edges between the leaf nodes and the parent nodes. For example, data analysis system 100 may generate an element for the edge set that corresponds to an edge having a value "value=12" and connections "vertex_1=383, vertex_2=288." In some implementations, the edge set identifies elements in the vertex set using an identifier. In various implementations, the value associated with an edge corresponds to the contribution of a child node to the metric value of a parent node. For example the edge value (e.g., edge weight, etc.) may be computed as $W_i$=weight($V_i$)=$\Sigma m_{slice}$ where $W_i$ is the edge value of an edge, $V_i$ is the metric value associated with a parent node, and $m_{slice}$ is the metric value associated with a child node. In some implementations, edges are represented using an adjacency matrix. In various implementations, data analysis system 100 generates elements of the vertex set and edge set based on observed metric values (e.g., the timeseries data received in step 202, etc.). Additionally or alternatively, data analysis system 100 may generate elements of the vertex set and edge set based on anticipated metric values (e.g., metric values generated based on Bayesian analysis of the timeseries data received in step 202, etc.). In some implementations, the graph is represented using a Laplacian matrix.

At step 302, data analysis system 100 may normalize connections between generated nodes. For example, after performing step 300 the generated edges may have different values that cannot be compared (e.g., based on different metric values, etc.) and data analysis system 100 may normalize the edge weights to be within a range (e.g., zero to one, etc.). In various implementations, data analysis system 100 implements the function $$a_{i,j} = \text{edge weight}(i,j) = \frac{W_j}{W_i} \in [0,1]$$

where $a_{i,j}$ is the weight of an edge connecting a first node i and a second node j, $W_j$ is the metric value associated the first node, and $W_i$ is the metric value associated with the second node. For example, data analysis system 100 may normalize the edge weights associated with the edges between the leaf nodes and parent nodes generated in step 300 to be within the range [0,1].

At step 304, data analysis system 100 may generate parent nodes. For example, data analysis system 100 may generate parent nodes corresponding to whatever is the highest hierarchy node currently existing on the generated graph. As an additional example, on a first execution of step 304, data analysis system 100 may generate a third level of nodes (e.g., the parent nodes of the parent nodes of the leaf nodes, etc.) and on a second execution of step 304, data analysis system 100 may generate a fourth level of nodes (e.g., the parent nodes of the parent nodes of the parent nodes of the leaf nodes, etc.). In various implementations, step 304 includes identifying slices at a higher level of abstraction (e.g., a higher hierarchy, etc.) than the nodes currently included in the graph from received timeseries data and generating nodes corresponding to the identified slices. In some implementations, generated nodes are not connected (e.g., via an edge) to other nodes. In various implementations, step 304 includes generating edges connecting the generated parent nodes and corresponding child nodes. In various implementations, steps 302 and 304 repeat until all nodes have been generated (e.g., until all the timeseries data is included in the generated graph, etc.). In various implementations, the top node in the generated graph is a root node. In various implementations, steps 300-304 are used to generate an observed graph (e.g., representing a portion of the timeseries data corresponding to a single timestamp). Additionally or alternatively, steps 300-304 may be used to generate an anticipated graph (e.g., representing anticipated metric values generated based on the timeseries data and/or other data, etc.). In various implementations, data analysis system 100 performs steps 300-304 for each timestamp in the timeseries data.

Figure 4C:
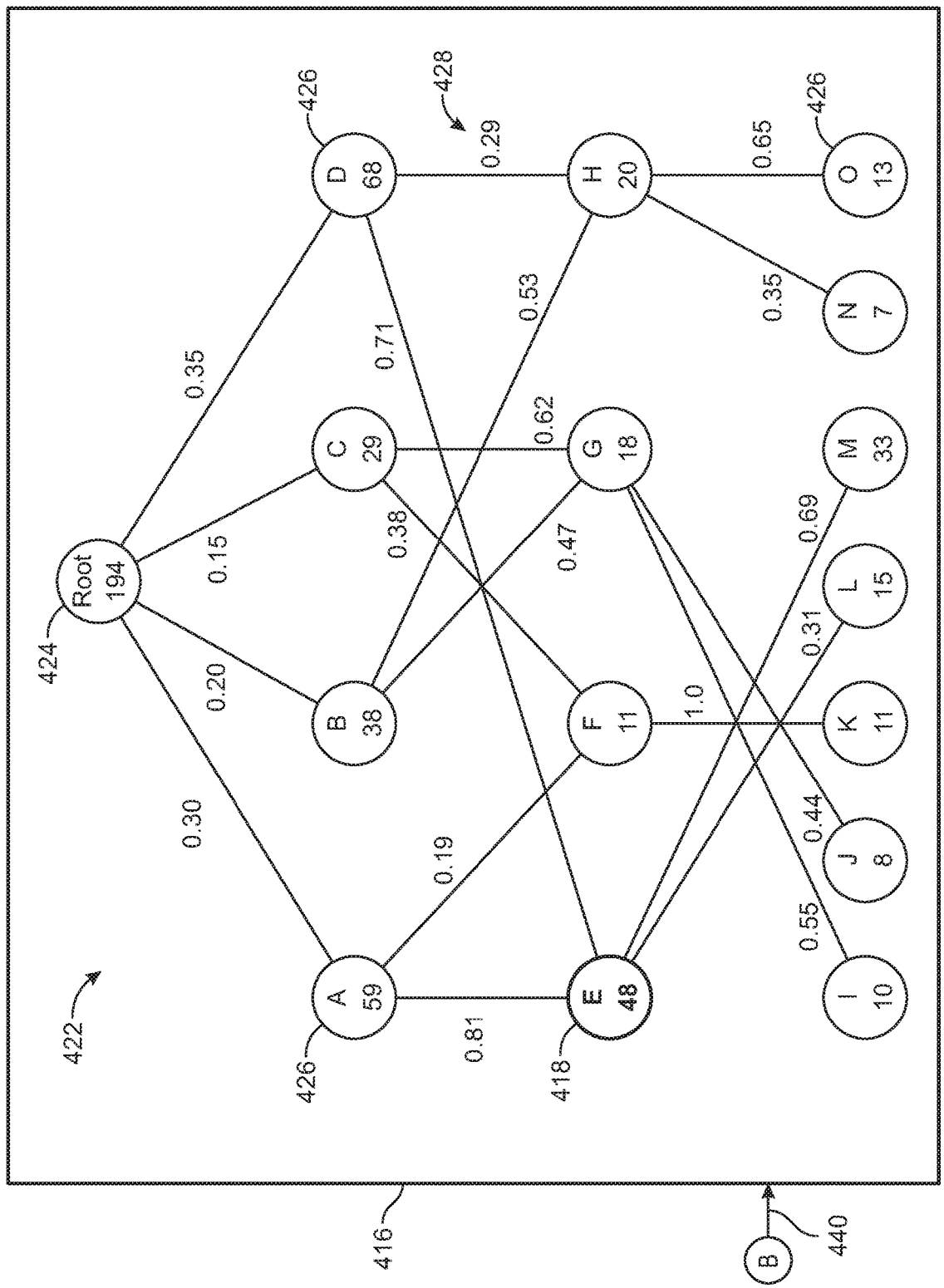

Referring now to FIGS. 4A-4C, process 400 for generating graphs, identifying graphs having an anomaly, and determining the principle contributors to the identified anomaly is shown, according to an illustrative implementation. In various implementations, data analysis system 100 performs process 400. Process 400 may begin at step 410 when timeseries data 402 is received from an external system. In various implementations, data analysis system 100 receives timeseries data 402 from an external system such as an analytics system. Timeseries data 402 may include a metric such as memory usage and a number of dimensions such as device, software version, mobile device, and the like. In various implementations, timeseries data 402 is hierarchical data. In some implementations, timeseries data 402 is granular data from which hierarchies and/or aggregations are computed. For example, data analysis system 100 may receive timeseries data including a 5-dimensional slice "time_value=2010-10-11 00:00:00.000-01:00, country_id=2116, serving_restriction=SERVING_RESTRICTION_NO_RESTRICTION, creative_id=1238484849, memory_usage=10" and may aggregate across all values of "creative_id" to generate a 4-dimensional slice that is a parent of the 5-dimensional slice. In various implementations, the parent node has a metric value that is the sum of the metric values associated with the corresponding child nodes. In various implementations, data analysis system 100 may compute aggregations at every possible level. To continue the previous example, data analysis system 100 may generate parent nodes corresponding to aggregations across "country_id" (a 1-dimensional slice), "country_id" and "serving_restriction" (a 2-dimensional slice), "serving_restriction" and "creative_id" (another 2-dimensional slice), "country_id" and "serving_restriction" and "creative_id" (a 3-dimensional slice), and the like.

In various implementations, step 410 includes separating timeseries data 402 by timestamp. In various implementations, data analysis system 100 separates timeseries data 402 by timestamp to generate one or more data structures 404. For example, data analysis system 100 may generate a number of tables from timeseries data 402, each table including timeseries data 402 associated with a specific timestamp.

At step 420, data analysis system 100 may generate one or more sets of graphs 412 based on data structures 404. In various implementations, each set of graphs 412 includes two graphs, first graph 406 and second graph 408. Additionally or alternatively, each set of graphs 412 may include a different number of graphs. First graph 406 may be associated with observed metric values and second graph 408 may be associated with anticipated metric values. In various implementations, step 420 includes generating anticipated metric values. For example, data analysis system 100 may compute a probability distribution of the metric value associated with each slice based on timeseries data 402 and may determine anticipated metric values based on the probability distributions. In various implementations, data analysis system 100 performs a Bayesian analysis of timeseries data 402 and/or other data (e.g., historical data, etc.). For example, data analysis system 100 may perform a Bayesian analysis of timeseries data 402 to generate an anticipated metric value associated with a slice such as "time_value=2019-10-13 00:00:00:000-07:00, country_id=2152, serving_restriction=SERVING_RESTRICTION_NO_RESTRICTION, creative_id=12347805, memory_usage=10, metric_mean=11, upper_bound=13.393993, lower_bound=2.33993390." In various implementations, the anticipated metric value associated with a slice includes an upper and a lower bound. In various implementations, data analysis system 100 generates first graph 406 based on data structures 404. For example, data analysis system 100 may generate first graph 406 to represent the metric values associated with each slice and/or each higher level computed slice (e.g., aggregations of lower level dimensions, etc.) included in timeseries data 402. In various implementations, data analysis system 100 generates second graph 408 based on the generated anticipated metric values. In various implementations, generating graphs 412 includes computing a metric value associated with every possible slice (e.g., every combination of dimensions possible, etc.). Additionally or alternatively, data analysis system 100 may compute metric values associated with a portion of the possible slices. In various implementations, timeseries data 402 is hierarchical data and data analysis system 100 treats the hierarchical data as a graph.

At step 430, data analysis system 100 may analyze graphs 412 to determine graphs of interest 414. Graphs of interest 414 may be selected from graphs 412. In various implementations, step 430 includes identifying a first graph 406 and a second graph 408 corresponding to a timestamp that represents a significant shift in the metric values associated with one or more nodes. For example, data analysis system 100 may identify a set of graphs corresponding to a timestamp where the metric values associated with one or more nodes of the observed graph are outside the range of anticipated metric values in the corresponding nodes of the anticipated graph (e.g., the upper and/or lower bounds, etc.). In some implementations, step 430 includes computing one or more eigenvectors associated with graphs 412. For example, data analysis system 100 may generate an eigenvector associated with each graph in graphs 412 and compare the cosine similarity of each observed graph (e.g., first graph 406, etc.) and anticipated graph (e.g., second graph 408, etc.) corresponding to each timestamp to identify a timestamp having the smallest cosine similarity which may represent the presence of an anomaly. Additionally or alternatively, other graph mining techniques may be used (e.g., generating PageRank vectors, treating the graphs as electrical circuits and calculating a resistance associated with the edge weights, etc.). In some various implementations, data analysis system 100 compares an angle between vectors associated with each graph (e.g., representing the cosine similarity, etc.). In various implementations, graphs of interest 414 include an anomaly. For example, graphs 412 may include a first set of graphs having a first first graph 406 (e.g., an observed graph) and a first second graph 408 (e.g., an anticipated graph) and a second set of graphs having a second first graph 406 (e.g., an observed graph) and a second second graph 408 (e.g., an anticipated graph). To continue the example, data analysis system 100 may compute a PageRank vector corresponding to the four graphs, compare a cosine similarity between the PageRank vector associated with the first first graph 406 and the first second graph 408 and with the second first graph 406 and the second second graph 408, and identify the first set of graphs or the second set of graphs as containing an anomaly based on the comparison of the cosine similarities of the PageRank vectors. In some implementations, graphs of interest 414 include two graphs, one of first graph 406 (e.g., an observed graph) and one of second graph 408 (e.g., an anticipated graph). In some implementations, step 430 includes measuring an entropy of graphs 412 and determining graphs of interest 414 based on the measured entropy.

At step 440, data analysis system 100 may analyze graphs of interest 414 to identify one or more node(s) of interest 418. Node(s) of interest 418 may correspond to nodes that significantly contribute to the deviation in the observed metric value from the anticipated metric value corresponding to the timestamp. For example, in step 430 data analysis system 100 may identify graphs of interest 414 corresponding to a significant deviation in an observed impression rate as compared to an anticipated impression rate associated with a content item at a specific timestamp, and in step 440 data analysis system 100 may determine that a node having dimensions "country_id=2152, serving_restriction=SERVING_RESTRICTION_NO_RESTRICTION" significantly contributed to the deviation. Additionally or alternatively, step 430 may include identifying anomalies associated with content items (e.g., changes in content items served, conversion rates, etc.). For example, step 430 may include identifying a significant drop in conversions associated with a content group and determining that a specific region and operating system principally contributed to the drop. As another example, step 430 may include identifying a significant increase in customer lifetime value associated with accounts having a set of characteristics and determining that specific characteristics principally contributed to the increase. In various implementations, node(s) of interest 418 are associated with a root cause of the identified anomaly. In various implementations, step 440 includes comparing PageRank vectors associated with graphs of interest 414. For example, data analysis system 100 may perform a component-wise comparison of a PageRank vector associated with the specific first graph 406 (e.g., an observed graph) and the specific second graph 408 (e.g., an anticipated graph) associated with the identified graphs of interest 414 to identify one or more node(s) of interest 418 having a difference. In some implementations, data analysis system 100 identifies node(s) of interest 418 based on a threshold difference.

Referring specifically to FIG. 4C, selected graph 416 is shown, according to an illustrative implementation. Selected graph 416 may correspond to one of graphs of interest 414. For example, selected graph 416 may be the specific first graph 406 corresponding to the identified graphs of interest 414. Selected graph 416 may include data structure 422 having node(s) 426 and edges 428. In various implementations, node(s) 426 are associated with slices of timeseries data. For example, the node 426 labeled "I" may represent timeseries data 402 corresponding to "time=1/20/2020, device=1, software version=0, and mobile device=1" and having the metric value of "memory usage=10." In various implementations, data structure 422 may include computed slices corresponding to all possible higher dimensional slices. For example, the node 426 labeled "G" may represent timeseries data 402 corresponding to "time=1/20/2020, software version=0, and mobile device=1" and the node 426 labeled "C" may represent timeseries data 402 corresponding to "time=1/20/2020, mobile device=1." In various implementations, the top node 426 of data structure 422 is root node 424. For example, root node 424 may be the parent node of node(s) 426 labeled "A, B, C, and D." Still referring to FIG. 4C, step 440 may include identifying node(s) of interest 418. In various implementations, node(s) of interest 418 are associated with a root cause of an anomaly. For example, the node 426 labeled "E" may represent "time=1/20/2020, software version=1, and mobile device=0" which may indicate that the combination of software version and mobile device type caused an anomaly such as a spike in memory usage. In some implementations, step 440 includes measuring an entropy of graphs of interest 414 and determining node(s) of interest 418 based on the measured entropy.

Figure 5:
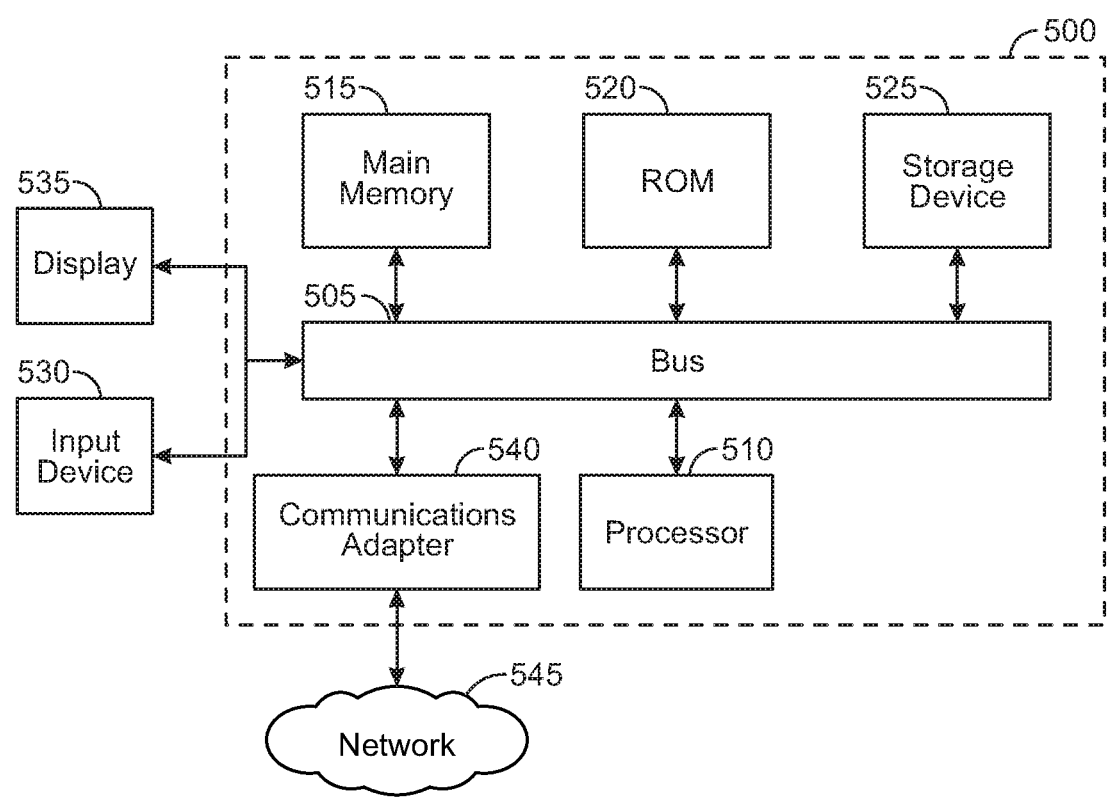
FIG. 5 is a block diagram of a computing system, according to an illustrative implementation.

FIG. 5 illustrates a depiction of a computing system 500 that can be used, for example, to implement any of the illustrative systems (e.g., data analysis system 100, etc.) described in the present disclosure. The computing system 500 includes a bus 505 or other communication component for communicating information and a processor 510 coupled to the bus 505 for processing information. The computing system 500 also includes main memory 515, such as a random access memory ("RAM") or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory ("ROM") 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. Communications adapter 540 may be coupled to bus 505 and may be configured to enable communications with a computing or communications network 545 and/or other computing systems. In various illustrative implementations, any type of networking configuration may be achieved using communications adapter 540, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users may be provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). The computer storage medium may be tangible and/or may be non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of identifying a contributing cause of anomalies, comprising:
receiving, by one or more processing circuits, a set of timeseries data representing metric values over time, wherein the timeseries data has at least two dimensions;
for each respective time stamp of two or more timestamps in the set of timeseries data:
generating, using an observed graph builder circuit, one or more first data structures storing a first graph having a first observed child node, a second observed child node, and an observed parent node, wherein:
the first observed child node corresponds to a first observed metric value for a first slice of the set of timeseries data at the respective timestamp;
the second observed child node corresponds to a second observed metric value for a second slice of the set of timeseries data at the respective timestamp; and
the observed parent node corresponds to an aggregation of the first observed metric value and the second observed metric value; and
generating, using an anticipated graph builder circuit, one or more second data structures storing a second graph having a first anticipated child node, a second anticipated child node, and an anticipated parent node, wherein:
the first anticipated child node corresponds to a first anticipated metric value for the first slice;
the second anticipated child node corresponds to a second anticipated metric value for the second slice;
the anticipated parent node corresponds to an aggregation of the first anticipated metric value and the second anticipated metric value; and
the first anticipated metric value and the second anticipated metric value are generated by the anticipated graph builder circuit based on the received set of time series data or historical time series data;
comparing, by the one or more processing circuits, the first and second graphs associated with each timestamp of the two or more timestamps in the set of timeseries data to identify a particular timestamp of two or more timestamps in the set of timeseries data including an anomaly; and
comparing, by the one or more processing circuits, and based on the first observed metric value and the first anticipated metric value, or based on the second observed metric value and the second anticipated metric value, the first and second graphs associated with the identified particular timestamp to identify a node that contributed in causing the anomaly.

2. The method of claim 1, wherein an edge between the first observed child node and the observed parent node is associated with a value that indicates a contribution of the first observed child node to the aggregation of the first observed metric value and the second observed metric value.

3. The method of claim 1, wherein comparing the first and second graphs associated with each timestamp includes generating, by the one or more processing circuits, a first and second eigenvector associated with the first and second graphs of the particular timestamp and comparing an angle between the first and second eigenvectors.

4. The method of claim 1, wherein comparing the first and second graphs associated with the identified particular timestamp includes performing, by the one or more processing circuits, an operation with a first eigenvector associated with the first graph and a second eigenvector associated with the second graph to generate a result, wherein the result includes an importance of each of a plurality of nodes of the first graph in contributing to the anomaly.

5. The method of claim 4, wherein the operation is vector subtraction and wherein the result is a vector.

6. The method of claim 1, wherein comparing the first and second graphs associated with the identified particular timestamp includes measuring, by the one or more processing circuits, an entropy of the first and second graphs.

7. The method of claim 1, the method further including determining, by the one or more processing circuits, a root cause of the anomaly based on the identified node, wherein the root cause is associated with a dimension of the identified node.

8. The method of claim 1, at least one of the first anticipated metric value or the second anticipated metric value generated based on:
computing, by the anticipated graph builder circuit, one or more probability distributions associated with the at least one of the first anticipated metric value or the second anticipated metric value at the respective time stamp; and
determining, by the anticipated graph builder circuit and based on the one or more probability distributions, the at least one of the first anticipated metric value or the second anticipated metric value.

9. The method of claim 1, comprising:
assigning, by the one or more processing circuits, a first weight to a first edge between the first observed child node and the observed parent node, the first weight corresponding to a proportion of the aggregation of the first observed metric value and the second observed metric value contributed by the first observed metric value; and assigning, by the one or more processing circuits, a second weight to a second edge between the second observed child node and the observed parent node, the second weight corresponding to a proportion of the aggregation of the first observed metric value and the second observed metric value contributed by the second observed metric value.

10. The method of claim 1, wherein the at least two dimensions describe characteristics of entities described by the set of timeseries data.

11. The method of claim 1, wherein the first anticipated metric value and the second anticipated metric value are generated based on a Bayesian analysis of the set of timeseries data.

12. A system for identifying a contributing cause of anomalies, the system comprising:
one or more processing circuits comprising one or more processors and one or more memories, the one or more memories having instructions stored thereon that, when executed by the one or more processors, cause the one or more processing circuits to:
receive a set of timeseries data representing metric values over time, wherein the timeseries data has at least two dimensions;
for each respective time stamp of two or more timestamps in the set of timeseries data:
generate, using an observed graph builder circuit, one or more first data structures storing a first graph having a first observed child node, a second observed child node, and an observed parent node, wherein:
the first observed child node corresponds to a first observed metric value for a first slice of the set of timeseries data at the respective timestamp;
the second observed child node corresponds to a second observed metric value for a second slice of the set of timeseries data at the respective timestamp; and
the observed parent node corresponds to an aggregation of the first observed metric value and the second observed metric value; and
generate, using an anticipated graph builder circuit, one or more second data structures storing a second graph having a first anticipated child node, a second anticipated child node, and an anticipated parent node, wherein:
the first anticipated child node corresponds to a first anticipated metric value for the first slice;
the second anticipated child node corresponds to a second anticipated metric value for the second slice;
the anticipated parent node corresponds to an aggregation of the first anticipated metric value and the second anticipated metric value; and
the first anticipated metric value and the second anticipated metric value are generated by the anticipated graph builder circuit based on the received set of time series data or historical time series data;
compare the first and second graphs associated with each timestamp of the two or more timestamps in the set of timeseries data to identify a particular timestamp of the two or more timestamps in the set of timeseries data including an anomaly; and
compare, based on the first observed metric value and the first anticipated metric value, or based on the second observed metric value and the second anticipated metric value, the first and second graphs associated with the identified particular timestamp to identify a node that contributed in causing the anomaly.

13. The system of claim 12, wherein an edge between the first observed child node and the observed parent node is associated with a value that indicates a contribution of the first observed child node to the aggregation of the first observed metric value and the second observed metric value.

14. The system of claim 12, wherein comparing the first and second graphs associated with each timestamp includes generating a first and second eigenvector associated with the first and second graphs of the particular timestamp and comparing an angle between the first and second eigenvectors.

15. The system of claim 12, wherein comparing the first and second graphs associated with the identified particular timestamp includes performing an operation with a first eigenvector associated with the first graph and a second eigenvector associated with the second graph to generate a result, wherein the result includes an importance of each of a plurality of nodes of the first graph in contributing to the anomaly.

16. The system of claim 15, wherein the operation is vector subtraction and wherein the result is a vector.

17. The system claim 12, wherein comparing the first and second graphs associated with the identified particular timestamp includes measuring an entropy of the first and second graphs.

18. The system of claim 12, comprising:
assigning, by the one or more processing circuits, a first weight to a first edge between the first observed child node and the observed parent node, the first weight corresponding to a proportion of the aggregation of the first observed metric value and the second observed metric value contributed by the first observed metric value; and
assigning, by the one or more processing circuits, a second weight to a second edge between the second observed child node and the observed parent node, the second weight corresponding to a proportion of the aggregation of the first observed metric value and the second observed metric value contributed by the second observed metric value.

19. The system of claim 12, wherein the at least two dimensions describe characteristics of entities described by the set of timeseries data.

20. The system of claim 12, wherein the first anticipated metric value and the second anticipated metric value are generated based on a Bayesian analysis of the set of timeseries data.

21. The system of claim 12, wherein the one or more processing circuits are further configured to determine a root cause of the anomaly based on the identified node, wherein the root cause is associated with a dimension of the identified node.

22. The system of claim 12, at least one of the first anticipated metric value or the second anticipated metric value generated based on:
computing, by the anticipated graph builder circuit, one or more probability distributions associated with the at least one of the first anticipated metric value or the second anticipated metric value at the respective time stamp; and
determining, by the anticipated graph builder circuit and based on the one or more probability distributions, the at least one of the first anticipated metric value or the second anticipated metric value.

23. One or more non-transitory computer-readable storage media having instructions stored thereon that, when executed by one or more processors, cause the one or more processors to:
receive a set of timeseries data representing metric values over time, wherein the timeseries data has at least two dimensions and wherein the at least two dimensions describe characteristics of entities that generated the values of the metric in the set of timeseries data;
for each respective time stamp of two or more timestamps in the set of timeseries data:
generate, using an observed graph builder circuit, one or more first data structures storing a first graph having a first observed child node, a second observed child node, and an observed parent node, wherein:
the first observed child node corresponds to a first observed metric value for a first slice of the set of timeseries data at the respective timestamp;
the second observed child node corresponds to a second observed metric value for a second slice of the set of timeseries data at the respective timestamp; and
the observed parent node corresponds to an aggregation of the first observed metric value and the second observed metric value; and
generate, using an anticipated graph builder circuit, one or more second data structures storing a second graph having a first anticipated child node, a second anticipated child node, and an anticipated parent node, wherein:
the first anticipated child node corresponds to a first anticipated metric value for the first slice;
the second anticipated child node corresponds to a second anticipated metric value for the second slice;
the anticipated parent node corresponds to an aggregation of the first anticipated metric value and the second anticipated metric value; and
the first anticipated metric value and the second anticipated metric value are generated by the anticipated graph builder circuit based on the received set of time series data or historical time series data;
compare the first and second graphs associated with each timestamp of the two or more timestamps in the set of timeseries data to identify a particular timestamp of the two or more timestamps in the set of timeseries data including an anomaly; and
compare, based on the first observed metric value and the first anticipated metric value, or based on the second observed metric value and the second anticipated metric value, the first and second graphs associated with the identified particular timestamp by generating a first and second eigenvector associated with the first and second graphs of the particular timestamp and comparing an angle between the first and second eigenvectors to identify a node that contributed in causing the anomaly.

24. The one or more computer-readable storage media of claim 23, wherein the first anticipated metric value and the second anticipated metric value are generated based on a Bayesian analysis of the set of timeseries data.

25. The one or more computer-readable storage media of claim 23, wherein the one or more processors are further configured to determine a root cause of the anomaly based on the identified node, wherein the root cause is associated with a dimension of the identified node.

26. The one or more computer-readable storage media of claim 23, at least one of the first anticipated metric value or the second anticipated metric value generated based on:
  computing, by the anticipated graph builder circuit, one or more probability distributions associated with the at least one of the first anticipated metric value or the second anticipated metric value at the respective time stamp; and
  determining, by the anticipated graph builder circuit and based on the one or more probability distributions, the at least one of the first anticipated metric value or the second anticipated metric value.

* * * * *